United States Patent
Iwasaki et al.

(10) Patent No.: US 7,526,522 B2
(45) Date of Patent: Apr. 28, 2009

(54) CONTENT-TRANSMITTING APPARATUS, CONTENT-RECEIVING APPARATUS, CONTENT TRANSMITTING/RECEIVING SYSTEM, METHODS, AND RECORDING MEDIUM THEREOF

(75) Inventors: Shiro Iwasaki, Iizuka (JP); Eiichi Hatae, Kaho-Gun (JP); Taiji Sawada, Iizuka (JP); Hiroyuki Yoshida, Kasuya-Gun (JP)

(73) Assignee: Panasonic Corporation, Osaka (JP)

( * ) Notice: Subject to any disclaimer, the term of this patent is extended or adjusted under 35 U.S.C. 154(b) by 914 days.

(21) Appl. No.: 10/670,530

(22) Filed: Sep. 26, 2003

(65) Prior Publication Data
US 2004/0097143 A1 May 20, 2004

(30) Foreign Application Priority Data
Sep. 27, 2002 (JP) .............................. 2002-283681

(51) Int. Cl.
*H04L 12/26* (2006.01)
(52) U.S. Cl. ...................... 709/203; 709/225; 370/235; 370/230; 370/252; 370/230.1; 370/231; 710/33; 710/55; 710/65; 710/68
(58) Field of Classification Search ................. 709/203, 709/225
See application file for complete search history.

(56) References Cited

U.S. PATENT DOCUMENTS

| | | | | |
|---|---|---|---|---|
| 6,979,769 B1 * | 12/2005 | Majima et al. | ................ | 84/645 |
| 2001/0041049 A1 * | 11/2001 | Kanda | .......................... | 386/52 |
| 2002/0126992 A1 * | 9/2002 | Sakuramoto | .................. | 386/77 |
| 2002/0126993 A1 * | 9/2002 | Sakuramoto et al. | .......... | 386/77 |
| 2003/0021055 A1 * | 1/2003 | Tange et al. | ................ | 360/72.1 |

FOREIGN PATENT DOCUMENTS

| | | |
|---|---|---|
| JP | 2001-125851 | 5/2001 |
| JP | 2002-007282 | 1/2002 |

* cited by examiner

*Primary Examiner*—Jude J Jean Gilles
(74) *Attorney, Agent, or Firm*—Wenderoth, Lind & Ponack, L.L.P.

(57) ABSTRACT

A content-transmitting apparatus transmits reproduction control information including order of reproduction, reproducing section, and reproduction date information of contents which transmitted in the past. In a content-receiving apparatus, when a transmission destination chooses a specific television channel using a receiving side input unit, a receiving side control unit reproduces contents according to the reproduction control information. When the transmission source controls contents including the contents which transmitted in the past to the transmission destination, the transmission destination can view and listen to the contents that the transmission source intends to reproduce, with easiness just like changing television channels.

21 Claims, 6 Drawing Sheets

Fig. 4(c) reproduction control information

| order of reproduction | content ID | reproduction starting position | reproduction stopping position |
|---|---|---|---|
| 1 | B | 150 | 18000 |
| 2 | A | 0 | 300 |
| 3 | A | 600 | 9000 |
| 4 | C | 300 | 14400 |

| reproduction date information | January 1, 2003 @ 0:00 |
|---|---|

Fig. 4(f) reproduction control information

| order of reproduction | content ID | reproduction starting position | reproduction stopping position |
|---|---|---|---|
| 1 | B | 150 | 18000 |
| 2 | A | 0 | 300 |
| 3 | A | 600 | 9000 |
| 4 | C | 300 | 14400 |

| reproduction date information | January 1, 2003 @ 0:00 |
|---|---|

CONTENT-TRANSMITTING APPARATUS, CONTENT-RECEIVING APPARATUS, CONTENT TRANSMITTING/RECEIVING SYSTEM, METHODS, AND RECORDING MEDIUM THEREOF

BACKGROUND OF THE INVENTION

1. Field of the Invention

The present invention relates to a content-transmitting apparatus, which transmits contents via a network, a content-receiving apparatus, which receives contents, and an art related thereto.

In this specification, "contents" means an arbitrary combination of a moving picture, a still picture, a text, or a pictograph, and "content data" means digital data that the above-mentioned contents are recorded in arbitrary formats.

2. Description of the Related Art

By using network communication, such as an E-mail and FTP, not only can character string data be transmitted, but also contents can be transmitted from a transmission source to a transmission destination; therefore, communication can be broaden.

People, who have technical knowledge, have taken the lead and have used such data communication up to the present.

An environment, which is capable to connect to a network such as the Internet, has widely spread to each home; therefore, chances for people such as the elderly and children who are not well versed in the network environment to receive data, have increased.

For this reason, there is need for improvements in data transmission that make data transmission easy than conventional systems.

Additionally, there is a need for a system that can transmit contents via a network, but that is less costly, has a nature of instancy and is advantageous when compared to a a recording medium, such as a disk or a tape that is sent physically.

It is considered that the system should be widely used in daily life. For example, in such a case where parents can take pictures of their child's graduation ceremony, create contents and then transmit the contents to grandparents (elderly people) who live at distant locations.

Currently, in order to transmit contents via a network, contents are transmitted as an attached E-mail, and the contents attached to the E-mail are reproduced by computers and cellular phones at the receiving side.

Conventional Receiving Side facilities are described in the following published Japanese Patent Application Laid-Open No. 2001-125851 (patent reference No. 1).

Figure 6A:
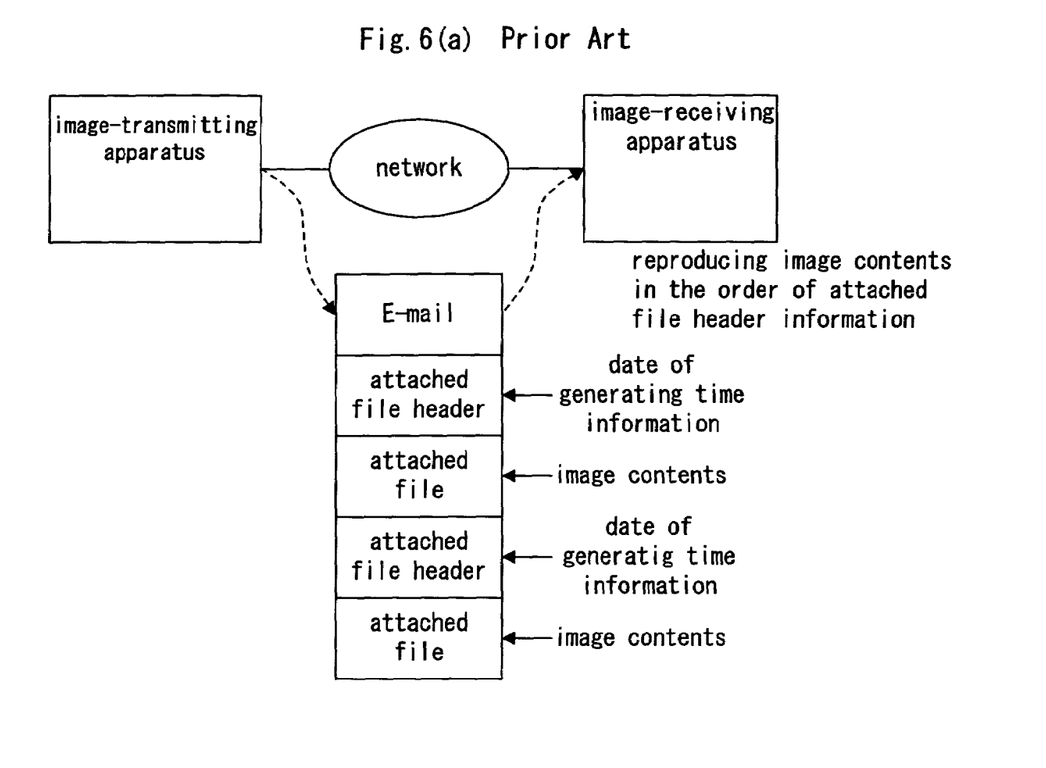

In this prior art, as shown in a FIG. 6 (a), not only is an attached file such as contents, but also an attached file header including transmitted time information and created date information of the attached file is attached and the E-mail is transmitted to a transmission destination.

At the receiving side, the attached file (e.g. contents) is reproduced based on the transmitted time information and created date information of the attached file header.

By doing so, even if a transmission destination does not know the right order of reproduction, contents are reproduced in the order of reproduction specified by a transmission source; therefore, convenience can be improved comparing to simply attaching a plurality of contents to an E-mail.

Additional related prior art is disclosed in published Japanese Patent Application Laid-Open No. 2002-7282 (patent reference No. 2).

Figure 6B:
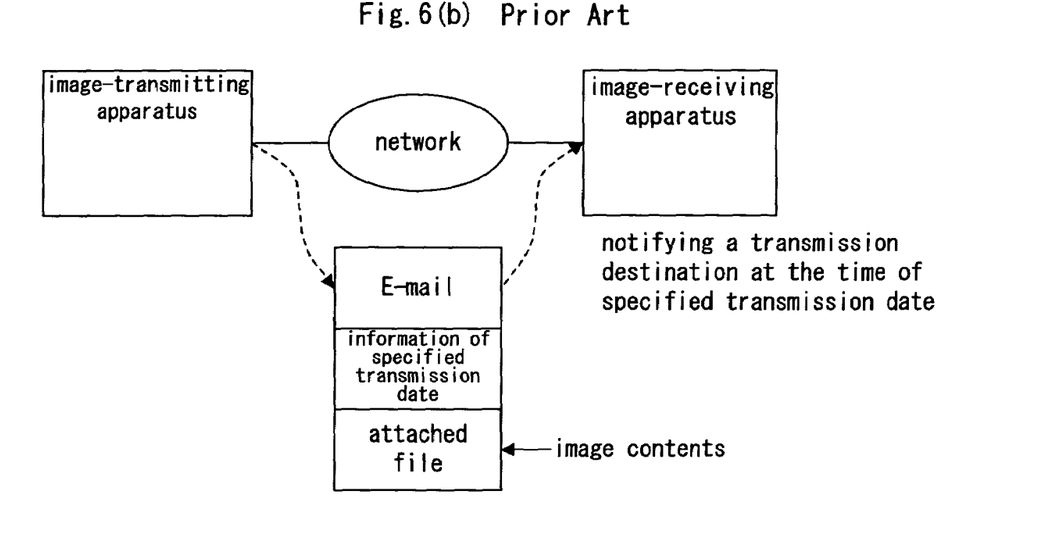

As shown in FIG. 6 (b), a transmission source adds information of specified transmission date to an E-mail, and transmits the E-mail.

A transmission destination is not notified of completion of receiving immediately after transmission, but after waiting purposely until it becomes the specified transmission date, the transmission destination is notified of the completion of receiving the data.

Thereby, the transmission destination has received the E-mail exactly on the date specified.

The prior art according to patent reference No. 2 is useful when notifying date has an important meaning, such as a birthday message and a wake-up call.

As mentioned on the above, since a transmission destination is not necessarily well versed in complicated operation of a personal computer etc., the transmission destination should be able to reproduce contents with easy operations as much as possible.

However, both patent references No. 1 and No. 2 have following problems, indicating that the prior arts thereof are inadequate.

The prior art according to patent references No. 1 is on the assumption that order of reproduction of contents sent with an attached file header is specified in the.

Therefore, contents whose order of reproduction can be specified by the attached file header are only the contents sent with this attached file header. Contents transmitted prior to transmission time of the attached file header from the same transmission source to the same transmission destination can not be specified.

According to the art, specifying order of reproduction of contents including contents transmitted in the past have to attach the contents transmitted in the past to an attached file header again, and transmit again.

Since contents generally have large size of data comparing to character string data, a load of network increases and longer time is necessary in order to complete sending and receiving when transmitting contents transmitted in the past again.

Furthermore, the same contents is stored multiplexingly in a recording unit of a content-receiving apparatus; therefore, it is useless and can be a factor pressing the capacity of the recording unit of the content-receiving apparatus.

In an E-mail, the prior art described in patent reference No. 2 has a point that only contents that is sent with an E-mail can specify reproducing date information. This point is similarly described by patent reference No. 1.

Therefore, there exits the same problem that patent reference No. 1 has.

However, in patent reference No. 2, the completion of receiving of an E-mail is intentionally hidden from a transmission destination until the time specified by the date information.

Therefore, it looks like that the contents received in the past is reproduced from the time specified by the date information.

However, this is only what has delayed the time to reproduce purposely.

An E-mail and contents are still sent together.

After all, in an E-mail, although a transmission destination has received in the past comparing to the time of transmission of an E-mail, the time to reproduce can not be specified for contents, which are not transmitted with the E-mail.

SUMMARY OF THE INVENTION

An object of the present invention is to provide a content transmitting/receiving system, which can transmit and receive contents more simply, and more easily.

A first aspect of the present invention provides a content transmitting/receiving system that includes a content-transmitting apparatus comprising a transmitting side recording unit; a content-receiving apparatus operable to connect to the content-transmitting apparatus via a network to receive a content from the content-transmitting apparatus; and a display apparatus operable to connect to the content-receiving apparatus to display a content that is reproduced by the content-receiving apparatus. The content-receiving apparatus comprises: a receiving side input unit operable to receive an input from a user; a receiving side recording unit operable to record information received from the content-transmitting apparatus; and a receiving side control unit operable to control the receiving side input unit and the receiving side recording unit. The content-transmitting apparatus is operable to transmit reproduction control information to the content-receiving apparatus, wherein the reproduction control information is operable to include reproduction control information regarding a content that has been transmitted to the content-receiving apparatus before transmission time of the reproduction control information. When the content has been recorded by the receiving side recording unit before the transmission time of the reproduction control information, the receiving side control unit is operable to reproduce, according to the reproduction control information, at least one of the content recorded by the receiving side recording unit and a processed content of the content recorded by the receiving side recording unit. When the content is attached to the reproduction control information received by the receiving side control unit, the receiving side control unit is operable to reproduce, according to the reproduction control information, at least one of the content that is attached to the reproduction control information and is recorded by the receiving side recording unit and a processed content of the content that is attached to the reproduction control information and is recorded by the receiving side recording unit.

According to the construction described above, even when a transmission source sets up the reproduction control information including the contents transmitted in the past to a transmission destination, the content-receiving apparatus can perform reproduction of the contents corresponding to the setting.

When a transmission source exercises leadership, a transmission destination does not need to consider anything, and contents can be reproduced according to an intention of the transmission source.

Therefore, even though a transmission destination is not well versed in a system, like an elderly person or a child, it can be easy for a transmission destination to perform advanced reproduction control.

As for contents transmitted to the content-receiving apparatus before the transmission time of reproduction control information and recorded in the receiving side recording unit, the receiving side recording unit reproduces the contents or original contents of the contents. Therefore, it is not necessary to multiplexingly record contents that were recorded in the past. Capacity of the receiving side recording unit can be efficiently used without waste.

A second aspect of the present invention as defined in the first aspect of the present invention provides a content-transmitting apparatus, wherein the transmitting side control unit is operable to transmit the content that has not been transmitted to the content-receiving apparatus, when the reproduction control information includes information regarding a content that has not been transmitted to the content-receiving apparatus before the transmission time of the reproduction control information.

According to the construction above, the content-transmitting apparatus does not need to resend the contents transmitted in the past, thus reducing a network load, and shortening the required time for a completion of transmitting/receiving. In addition, wasteful recording in the receiving side recording unit can be avoided.

A third aspect of the present invention provides a content-receiving apparatus, wherein the content-receiving apparatus comprises a receiving side input unit operable to receive changing operation for TV channels, and wherein the receiving control unit is operable to reproduce the content based on the changing operation for the TV channels.

According to the construction described above, a transmission destination can view and listen to the contents sent from a transmission source easily just like changing television channels, without complicated operations of a personal computer and AV equipment. An easier system can be built for people, like elderly people and children, who are not well versed in a system.

A fourth aspect of the present invention as defined in the third aspect of the present invention provides a content-receiving apparatus, wherein, when the receiving side control unit receives the reproduction control information including ID information of a content to be deleted, the receiving side control unit is operable to delete the content indicated by the ID information of the content to be deleted from the receiving side recording unit.

According to the construction described above, a transmission source can delete the contents transmitted in the past to the transmission destination by a remote operation.

Therefore, the transmission destination does not have to perform deleting operation of contents by itself, if the transmission destination leaves it to the transmission source. Contents can be transmitted and received, without the transmission source and the transmission destination worrying about overflow of the capacity of the receiving side recording unit.

A fifth aspect of the present invention as defined in the third aspect of the present invention provides a content-receiving apparatus, wherein the reproduction control information is operable to include order of reproduction of the content, and wherein the receiving side control unit is operable to reproduce the content according to the order of reproduction of the content.

According to the construction described above, a transmission destination can view and listen to contents, without complicated operations, in the order of reproduction that a transmission source has specified, if the transmission destination leaves it to the transmission source.

A sixth aspect of the present invention as defined in the third aspect of the present invention provides a content-receiving apparatus, wherein the reproduction control information is operable to include a reproduction section of the content, and wherein the receiving side control unit is operable to reproduce the content according to the reproduction section of the content.

According to the construction described above, a transmission destination can view and listen to contents, without complicated operations, for reproducing sections that a transmission source has specified, if the transmission destination leaves it to the transmission source.

A seventh aspect of the present invention as defined in the third aspect of the present invention provides a content-receiving apparatus, wherein the reproduction control information is operable to include a reproduction date of the content, and wherein the receiving side control unit is operable to reproduce the content according to the reproduction date of the content.

According to the construction described above, a transmission destination can view and listen to contents, without complicated operations, according to reproduction date that a transmission source has specified, if the transmission destination leaves it to the transmission source.

In this manner, when reproduction control information is utilized, the transmission source can program contents including the contents transmitted in the past.

For example, when the transmission source transmits contents of graduation to the transmission destination, the transmission source can establish reproduction control information, such as desired reproducing sections and an order of reproduction containing contents of an entrance ceremony transmitted in the past. Thus, the transmission source can change programming for the transmission destination without resending contents transmitted in the past.

In such a content transmitting/receiving system, in the case where communication has a significant meaning in time of sending messages, such as a birthday message and greetings for a New Year, receiving notice of contents to the transmission destination or a reproduction start can be performed when the specified date comes.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 (a) is an illustration of recording configuration for content data in the first embodiment of the present invention.

FIG. 4 (b) is an explanatory diagram of a content ID table in the first embodiment of the present invention.

FIG. 4 (c) is an explanatory diagram of reproduction control information in the first embodiment of the present invention.

FIG. 4 (d) is an illustration of recording configuration for content data in the first embodiment of the present invention.

FIG. 4 (e) is an explanatory diagram of a content ID table in the first embodiment of the present invention.

FIG. 4 (f) is an explanatory diagram of reproduction control information in the first embodiment of the present invention.

FIG. 6 (a) is a schematic diagram, illustrating a conventional content transmitting/receiving system.

FIG. 6 (b) is a schematic diagram of a conventional content transmitting/receiving system.

DETAILED DESCRIPTION OF THE PREFERRED EMBODIMENTS

Hereinafter, a description is given of embodiments of the invention with reference to the accompanying drawings.

Figure 1:
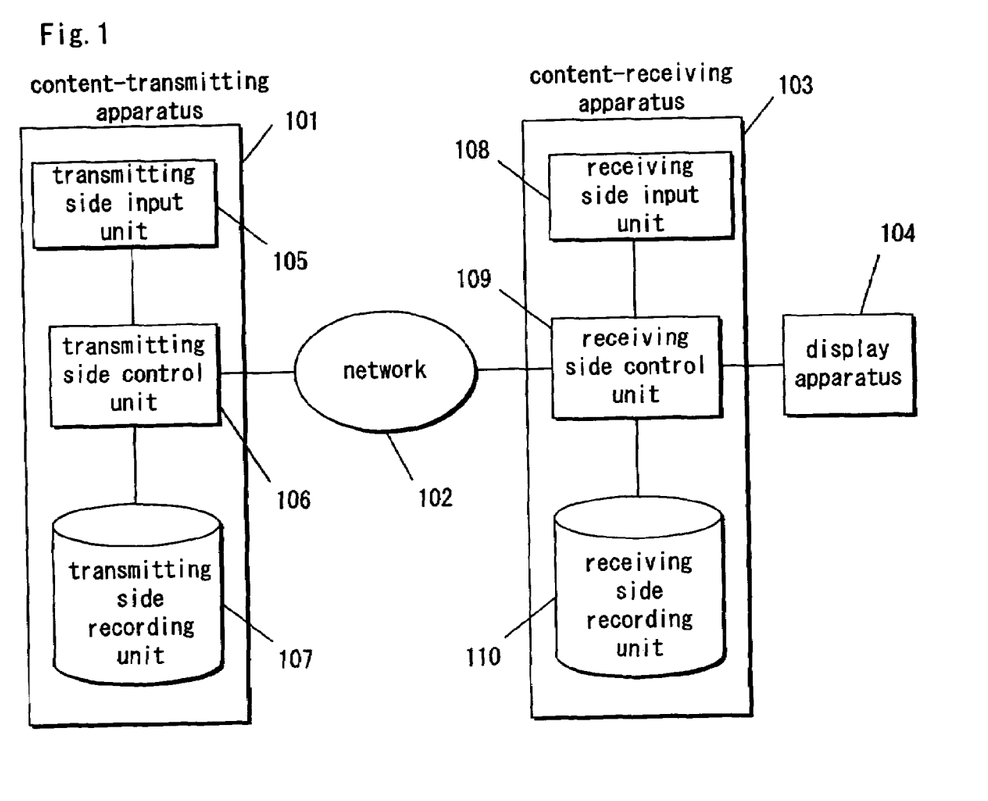
FIG. 1 is a block diagram, illustrating a content transmitting/receiving system in a first embodiment of the present invention.

FIG. 1 is a block diagram, illustrating a content transmitting/receiving system in a first embodiment of the present invention.

First, the outline of the present embodiment is explained, referring to FIG. 1.

The content transmitting/receiving system of the present embodiment comprises a content-transmitting apparatus 101 that has a transmission side recording unit 107 operable to record contents, a content-receiving apparatus 103 that connects with the content-transmitting apparatus 101 via a network 102, and receives contents from the content-transmitting apparatus 101, and a display apparatus 104 that is connected with the content-receiving apparatus 103 and displays contents which the content-receiving apparatus 103 reproduces.

The content-receiving apparatus 103 comprises a receiving side input unit 108 that receives input from a user, a receiving side recording unit 110 that records information received from the content-transmission apparatus 101, and a receiving side control unit 109 that controls the receiving side input unit 108 and the receiving side recording unit 110.

The content-transmitting apparatus 101 transmits the reproduction control information of contents to the content-receiving apparatus 103. The reproduction control information of contents can include reproduction control information regarding a content that has been transmitted to the content-receiving apparatus 103, and has been recorded in the receiving side recording unit 110 before the transmission time of the reproduction control information.

The receiving side control unit 109 follows the reproduction control information, and reproduces contents, which are transmitted to the content-receiving apparatus 103 before the transmission time of the reproduction control information and then recorded in the receiving side recording unit 110 or processed contents.

The receiving side control unit 109 follows the reproduction control information, and reproduces contents, which are transmitted with the reproduction control information and stored into the content-receiving apparatus 103, or the processed contents.

Processed contents are the contents on which processing, such as editing, manipulating, copying or transferring, is performed.

In short, after recording, the contents recorded in the receiving side recording unit 110 do not need to be always saved as first recorded. As long as the contents are apprehended by management information such as the reproduction control information and the content ID table, the contents can be saved in the receiving side recording unit 110 in any form.

Only when the reproduction control information includes information regarding contents that have not yet been recorded in the receiving side recording unit 110, the content-transmitting apparatus 101 transmits the contents to the content-receiving apparatus 103.

The receiving side input unit 108 receives changing operation input for TV channels, and the receiving side control unit 109 reproduces contents based on this changing operation input.

In the present embodiment, it is assumed that the channel "5" is assigned as a reproduction start of received contents.

However, the channel number does not have to be "5", and any channel number can be assigned.

For example, it is good to assign an unassigned channel to which any broadcasting station is not assigned.

When channel number information operable to reproduce transmitted contents is included in the reproduction control information, the transmission source can specify a channel that the transmission destination reproduces contents.

For example, when a channel "4" and a channel "5" are unassigned, contents of a photographed entrance ceremony are assigned as the channel "4", and contents of a photographed school sports are assigned as the channel "5".

Thereby, the transmission destination just needs to choose a channel in order to view and listen to contents, and it is very convenient.

Thus, by assigning changing-channel-command at the start of reproduction, the transmission destination can view and listen to contents received via a network with the same interface of watching TV. The transmission destination, who is not well versed in complicated operation of a personal computer or AV equipment, can also view and listen to the contents intuitively and easily.

Reproduction may be started by not only the channel number but also by a trigger of the display menu for directing the state of reproduction or by depressing a remote control button, etc.

When the content-transmitting apparatus 101 transmits the information including ID information of the contents which indicates a candidate for deletion in the content-receiving apparatus 103, the receiving side control unit 109 deletes the concerned contents that this ID information indicates from the receiving side recording unit.

Reproduction control information includes an order of reproduction, a reproducing section, and reproduction date for the contents in the receiving side recording unit 110, and the receiving side control unit 109 reproduces the concerned contents according to the order of reproduction, the reproducing section, and the reproduction date.

Next, details of the content transmitting/receiving system are explained, referring to FIG. 1.

First, the content-transmitting apparatus 101 transmits data, such as contents, to the content-receiving apparatus 103 via the network 102.

The content-receiving apparatus 103 receives the data, such as contents, from the content-transmitting apparatus via the network 102.

The display apparatus 104, connected to the content-receiving apparatus 103, displays contents that the content-receiving apparatus 103 reproduces.

A transmission side input unit 105 within the content-transmitting apparatus 101 receives an input of a transmission source.

The transmission side recording unit 107 records contents, reproduction control information and so on.

A transmission side control unit 106 controls the transmission side input unit 105 and the transmission side recording unit 107, and transmits data, such as contents, via networks, like the Internet.

The transmission side input unit 105 is a command input means for the transmission source, such as a remote control device, a keyboard, and a mouse, and notifies the command of the transmission source to the transmission side control unit 106.

Although the transmission side input unit 105 is not limited to the remote control device, the keyboard, and the mouse, a preferable transmission side input unit is one with which a transmission source is able to simply input reproduction control information into the content-transmitting apparatus 101.

The transmission side recording unit 107 is nonvolatile recording media, such as a hard disk, a flash memory, and a DVD disk, and records accumulatively data of contents and management information (reproduction control information etc.) required for transmitting and receiving contents.

The management information is explained in detail later, referring to FIG. 4.

At the transmission side recording unit 107, as long as contents and management information can be recorded accumulatively, arbitrary storing media may be used.

The transmission side control unit 106 is composed of a CPU (Central Processing Unit) and ROM (Read Only Memory) etc., and performs analysis of a transmission source command inputted from the transmission side input unit 105, recording, deleting, and sending of contents, and creating and sending of reproduction control information.

Figure 2:
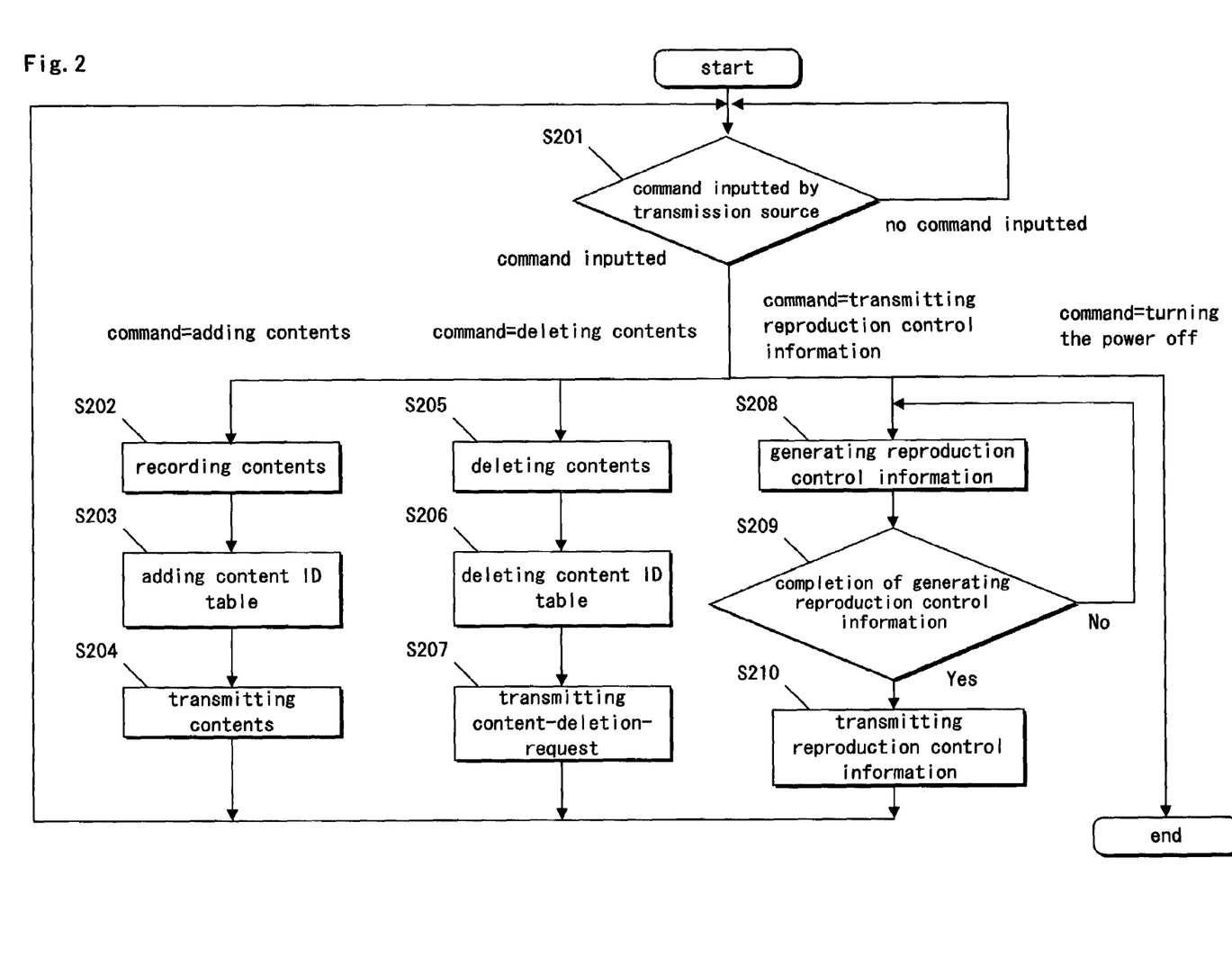
FIG. 2 is a flowchart, illustrating a transmission side control unit in the first embodiment of the present invention.

The ROM stores a program that the CPU executes, according to the flowchart shown in FIG. 2.

The content-receiving apparatus 103 has the following elements.

The receiving side input unit 108 receives an input of a transmission destination.

The receiving side recording unit 110 records contents, such as reproduction control information.

The receiving side control unit 109 controls the receiving side input unit 108 and the receiving side recording unit 110, and receives data, such as contents, by via a network, such as the Internet.

The receiving side input unit 108 is a command input means for the transmission destination, such as a remote control device, a keyboard, and a mouse, and notifies a command of the transmission destination to the receiving side control unit 109.

Although the receiving side input unit 108 is not limited to the remote control device, the keyboard, and the mouse, a preferable receiving side input unit is one with which a transmission destination is able to simply input reproduction control information into the content-receiving apparatus 103.

The receiving side recording unit 110 is nonvolatile recording media, such as a hard disk, a flash memory, and a DVD disk, and records accumulatively data of contents and management information (reproduction control information etc.) required for transmitting and receiving contents.

As the receiving side recording unit 110, as long as contents and management information can be recorded accumulatively, arbitrary storing media may be used.

For example, when the receiving side recording unit 110 has both a hard disk and a DVD disk drive, dubbing information from the hard disk to the DVD disk may be preferably included in reproduction control information.

Following the dubbing information, dubbing is made just as the transmission source has instructed, thus the transmission destination does not need to operate anything. This dubbing method is especially convenient when the transmission destination is not experienced in the operation.

The receiving side control unit 109 is composed of a CPU (Central Processing Unit) and ROM (Read Only Memory) etc., and performs analysis of a transmission source command from the receiving side input unit 108, recording, deleting, and receiving of contents, and creating and receiving of reproduction control information.

Figure 3:
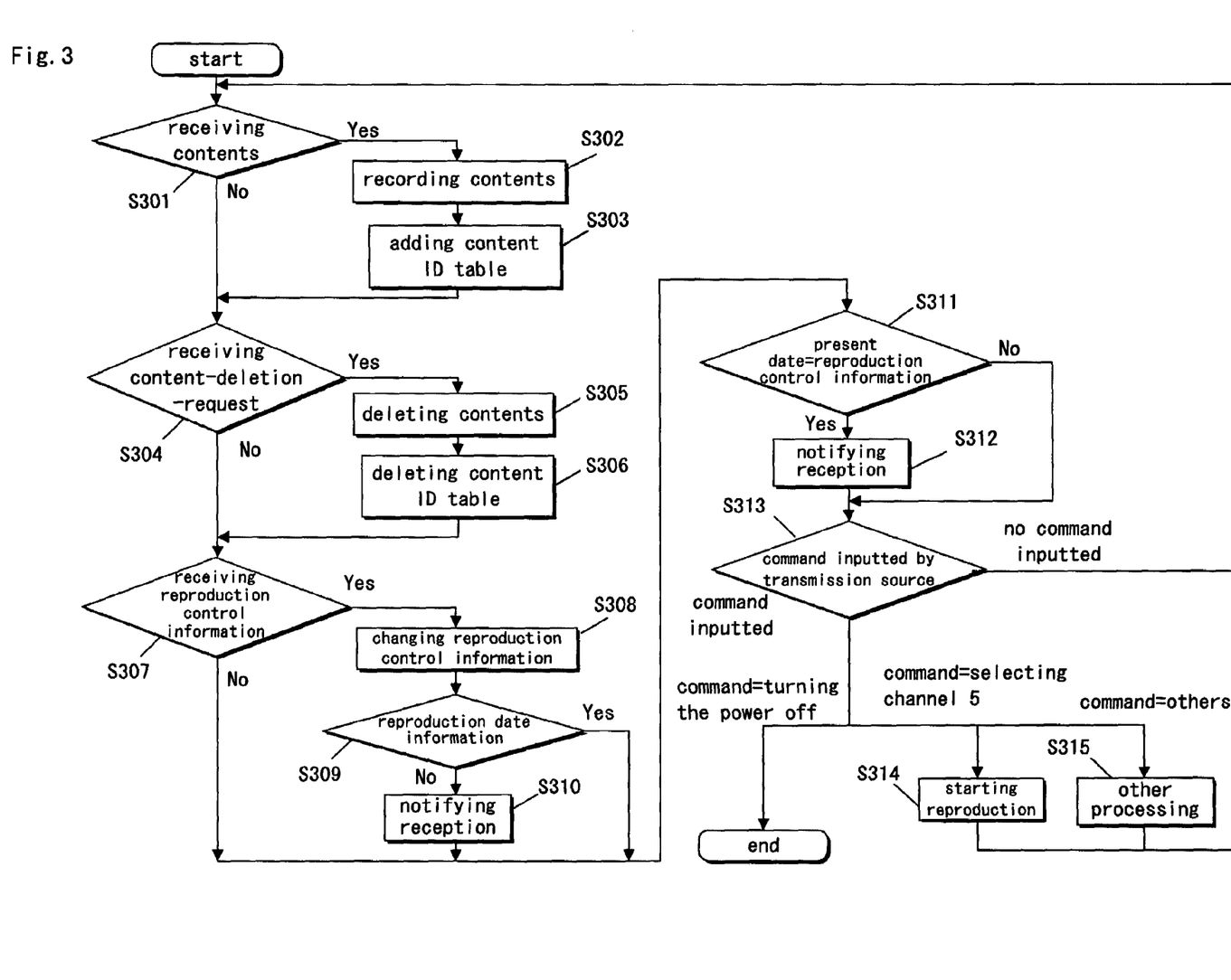
FIG. 3 is a flowchart, illustrating a receiving side control unit in the first embodiment of the present invention.

The ROM stores a program that the CPU executes, according to the flowchart shown in FIG. 3.

The display apparatus 104 is a display device, such as a Braun tube, an LCD, or a plasma display, and displays a content signal outputted from the receiving side control unit 109.

Arbitrary display devices may be used as the display apparatus 104.

The transmission side control unit 106 and the receiving side control unit 109 communicate with each other according to arbitrary sending/receiving methods.

For example, general sending/receiving methods, such as an E-mail and FTP may be used.

The network 102 is a communication medium that can transmit and receive data, such as contents. The network 102 includes a WAN, such as the Internet, and LAN, such as an enterprise network and home network, etc.

Kinds and communication protocols of the network 102 can be arbitrarily chosen.

Next, in the content-transmitting apparatus 101 and the content-receiving apparatus 103, the flow of processing when transmitting and receiving of contents are performed via the network 102, and the data that is recorded in recording units 107 and 110 are explained, referring to FIGS. 2 and 4.

Here, FIG. 2 is the flowchart of the content-transmitting apparatus in the first embodiment of the present invention. FIGS. 4 (a), (b), and (c) show the data configuration of the transmission side recording unit 107, respectively. FIGS. 4 (d), (e), and (f) show the data configuration of the transmission side recording unit 110, respectively.

As shown in FIG. 2, the transmission side control unit 106 of the content-transmitting apparatus 101 performs the following processing.

First, in Step S201, the transmission side control unit 106 waits for a command input of a transmission source from the transmission side input unit 105. When there is a command input, the transmission side control unit 106 analyzes the contents of the command.

When the transmission source command indicates "addition of contents", the contents are recorded accumulatively in the transmission side recording unit 107 in Step S202.

When content data A, B, and C are assumingly added as contents, as shown in FIG. 4 (a), the content data A, B, and C are recorded in the transmission side recording unit 107, and the transmission side control unit 106 obtains pointers pa, pb, and pc that indicate respectively the heads of content data A, B, and C, from the transmission side recording unit 107.

When these data are compressed data, such as MPEG and JPEG, the transmission side control unit 106 performs encoding processing, and records the stream after encoding as content data in the transmission side recording unit 107.

Of course, the transmission side control unit 106 can record contents that are not compressed in the transmission side recording unit 107.

Next, in Step S203, the transmission side control unit 106 creates a content ID table as shown in FIG. 4 (b), and sets the content ID (A, B, C) and its pointer (pa, pb, pc), each corresponding to content data A, B, and C, in the corresponding entries of the content ID table.

In Step S204, the transmission side control unit 106 transmits data, such as contents which have been newly and additionally recorded, from the transmission side control unit 106 to the receiving side control unit 109.

In the present embodiment, the transmission side control unit 106 transmits the content data and content ID of contents to the receiving side control unit 109 at this time.

In Step S201, when the command which the transmission source inputted indicates "deletion of contents", the transmission side control unit 106 advances the processing to Step S205, and deletes the contents specified by the transmission source from the transmission side recording unit 107.

For example, when deletion of the contents whose content ID is "C" is assumingly directed, the substance of the content data C and the content pointer pc shown in FIG. 4 (a) are deleted.

In Step S206, the transmission side control unit 106 deletes the entry of the contents which deletion of contents is specified, from the content ID table shown in FIG. 4 (b).

For example, when deletion of the contents whose content ID is "C" is directed, the entry whose content ID shown in FIG. 4 (b) is "C" is deleted.

Next, the transmission side control unit 106 transmits ID of the contents whose deletion is specified, from the transmission side control unit 106 to the receiving side control unit 109 in Step S207.

For example, when deletion of the contents whose content ID is "C" is directed, the transmission side control unit 106 transmits ID "C" of contents to the receiving side control unit 109.

When the command, which the transmission source inputted in Step S201, indicates "transmitting of reproduction control information", the transmission side control unit 107 creates reproduction control information, and records the reproduction control information in the transmission side recording unit 107 in Step S208 as shown in FIG. 4 (c).

The reproduction control information illustrated in FIG. 4 (c) shows that the following reproduction control should be performed.

Figure 4A:
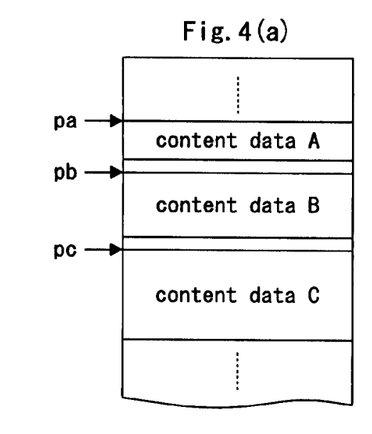
Figure 4B:
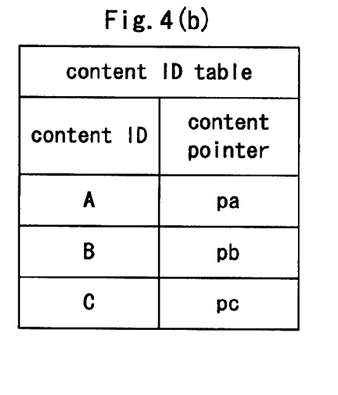
Figure 4C:
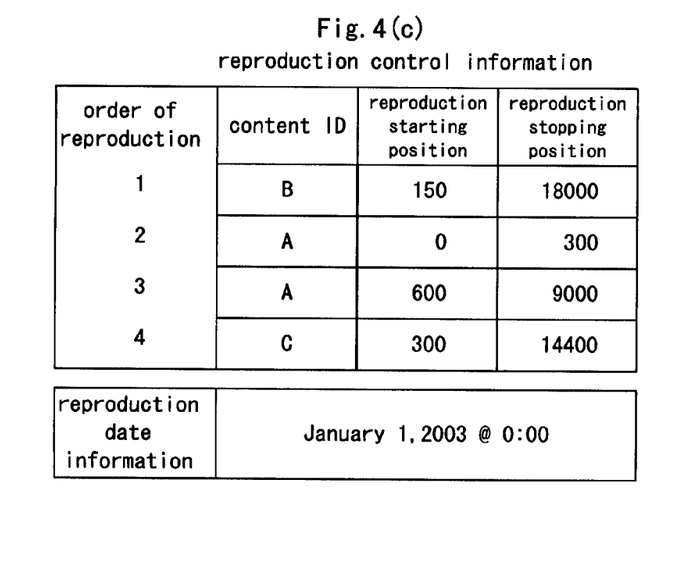

That is to say, first, contents of content ID "B" should be reproduced "from 150 frames to 18000 frames" at "0:00 on Jan. 1, 2003", which reproduction date information indicates.

Second, contents of content ID "A" should be reproduced "from zero frame to 300 frames".

Third, contents of content ID "A" should be reproduced "from 600 frames to 9000 frames".

Fourth, contents of content ID "C" should be reproduced "from 300 frames to 14400 frames".

In the present embodiment, a reproduction starting position and a reproduction stopping position are expressed with a number of frames, and it can be expressed with a number of fields or can be written with reproduction time from the beginning of contents.

In short, expression is arbitrary as long as an index can specify a reproducing section within the contents.

The expression of reproduction date information is not limited to date and time, and it can be expressed with a value of clock counter synchronized between the content-transmitting apparatus and the content-receiving apparatus etc. as long as the index can specify timing of reproduction.

Reproduction date information may be not only certain date information, but also a recursive setting, such as every hour, every day, every week, or every month.

Next, the transmission side control unit 106 judges whether or not the transmission source has instructed the completion of generating reproduction control information in Step S209.

When there is no instruction of completion, the processing of reproduction control information generating in Step S208 is continued further. When there is instruction of completion, the processing is shifted to Step S210.

In Step S210, the transmission side control unit 106 transmits the generated reproduction control information to the receiving side control unit 109 from the transmission side control unit 106.

In Step S201, when the command of the transmission source indicates "power off", the transmission side control unit 106 performs a completion processing, and ends the program.

Next, the flow of processing for the receiving side control unit 109 is explained using FIG. 3.

In Step S301, the receiving side control unit 109 judges whether or not contents from the network 102 have been received. When the contents have not been received, the processing is shifted to Step S304. When the contents have been received, the processing is shifted to Step S302.

The receiving side control unit 109 receives content data from the transmission side control unit 106 via the network 102, and records accumulatively the content data in the receiving side recording unit 110 in Step S302.

The receiving side control unit 109 receives content ID from the transmission side control unit 106 at this time.

When the receiving side control unit 109 has assumingly received content data A, B, and C, as shown in FIG. 4 (d), the content data A, B, and C are recorded in the receiving side recording unit 110, and the receiving side control unit 109 acquires pointers pa', pb' and pc' that indicate respectively the heads of the content data A, B, and C, from the receiving side recording unit 110.

Figure 4D:
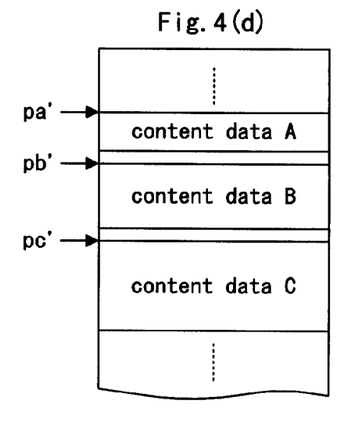
Figure 4E:
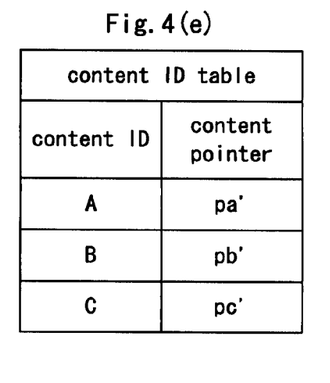
Figure 4F:
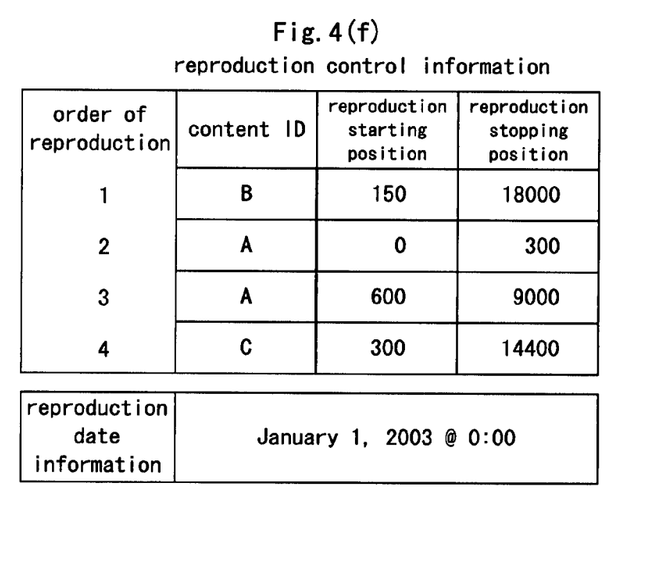

These pointers pa', pb', and pc' do not need to be in agreement with the pointers pa, pb, and pc of the transmission side recording unit 107.

Next, in Step S303, the receiving side control unit 109 generates a content ID table as shown in FIG. 4 (e), and sets the content ID (A, B, C) and its pointer (pa', pb', pc'), each corresponding to content data A, B, and C, in the corresponding entries of the content ID table.

In Step S304, the receiving side control unit 109 judges whether or not it has received content deleting request from the network 102. When the receiving side control unit 109 has received the request, the processing is shifted to Step S 307. When it has not received the request, the processing is shifted to Step S305.

In Step S305, the receiving side control unit 109 deletes content data with specified ID from the receiving side recording unit 110. The receiving side control unit 109 also deletes the entry that this content ID indicates in the content ID table, from the receiving side recording unit 110 in Step S306.

In Step S307, the receiving side control unit 109 judges whether or not it has received reproduction control information from the network 102. When the receiving side control unit 109 has not received the information, the processing is shifted to Step S311. When it has received the information, the processing is shifted to Step S308.

In Step S308, the receiving side control unit 109 receives reproduction control information as shown in FIG. 4 (f), from the transmission side control unit 106 via the network 102.

The contents of the reproduction control information are the same as what has been shown in FIG. 4 (c).

In Step S309, the receiving side control unit 109 judges whether or not reproduction date information exists in the received reproduction control information.

When the reproduction date information exists, the receiving side control unit 109 shifts the processing to Step S311. When the reproduction date information does not exist, the receiving side control unit 109 shifts the processing to Step S310.

In Step S310, the receiving side control unit 109 notifies the transmission destination that the contents have been received.

The notice can be given by turning LED on, superposing the notice on contents that are displayed on the display apparatus 104, generating specific voice sound and so on. Any notice means suffices as long as a transmission destination can recognize the reception of contents.

In the present embodiment, in Step S310, the example of performing receiving notice is shown. Reproduction of contents received in Step S310 may be started based on the received reproduction control information, displaying reproduction contents on the display apparatus 104.

In Step S311, the receiving side control unit 109 judges whether or not the present time has reached the date of the reproduction date information in the reproduction control information.

When it has reached the date, the receiving side control unit 109 shifts the processing to Step S312. When it has not reached the date, the receiving side control unit 109 shifts the processing to Step S313.

When reproduction date information is not specified in the reproduction control information, the step S311 and the Step S312 may be omitted.

In Step S312, the receiving side control unit 109 notifies the transmission destination that contents have been received, as in Step S310.

As in Step S310, any notice means suffices as long as the transmission destination can recognize the receiving of contents.

In the present embodiment, in Step S312, the example of performing receiving notice is shown. Reproduction of contents received in Step S312 may be started based on the reproduction control information received, displaying reproduction contents on the display apparatus 104.

In Step S313, the receiving side control unit 109 judges whether or not there is any input of the transmission destination command at the receiving side input unit 108 by the transmission destination.

When there is no input of the transmission destination command, the receiving side control unit 109 shifts the processing to Step S301. When there is an input of the transmission destination command, the receiving side control unit 109 performs processing for every command.

For example, when the transmission destination command selects channel "5", the processing is shifted to Step S314.

In the present embodiment, as mentioned above, the channel "5" is previously assigned to the content-transmitting apparatus 101, as a channel for reproduction of the contents received from the transmission source.

In Step S314, the receiving side control unit 109 starts reproducing the received contents based on the received reproduction control information (FIG. 4 (f)). When the reproduction is completed or when the transmission destination inputs command that means stopping the reproduction, the processing is returned to Step S301.

In the reproduction, the reproduction contents are outputted from the receiving side control unit 109, and are displayed on the display apparatus 104.

When the contents that are stored in the receiving side recording unit 110, is compressed data, such MPEG and JPEG, the receiving side control unit 109 performs decode processing, and outputs the signal after decoding to the display apparatus 104.

In Step S313, when there is a transmission destination command input indicating "power off", the receiving side control unit 109 performs a completion processing, and the program is ended.

In Step S313, when there is a transmission destination command input, indicating not the selection of a channel "5" nor "power off", the receiving side control unit 109 performs other processing (they may be set up arbitrarily), and returns processing to Step S301.

Figure 5:
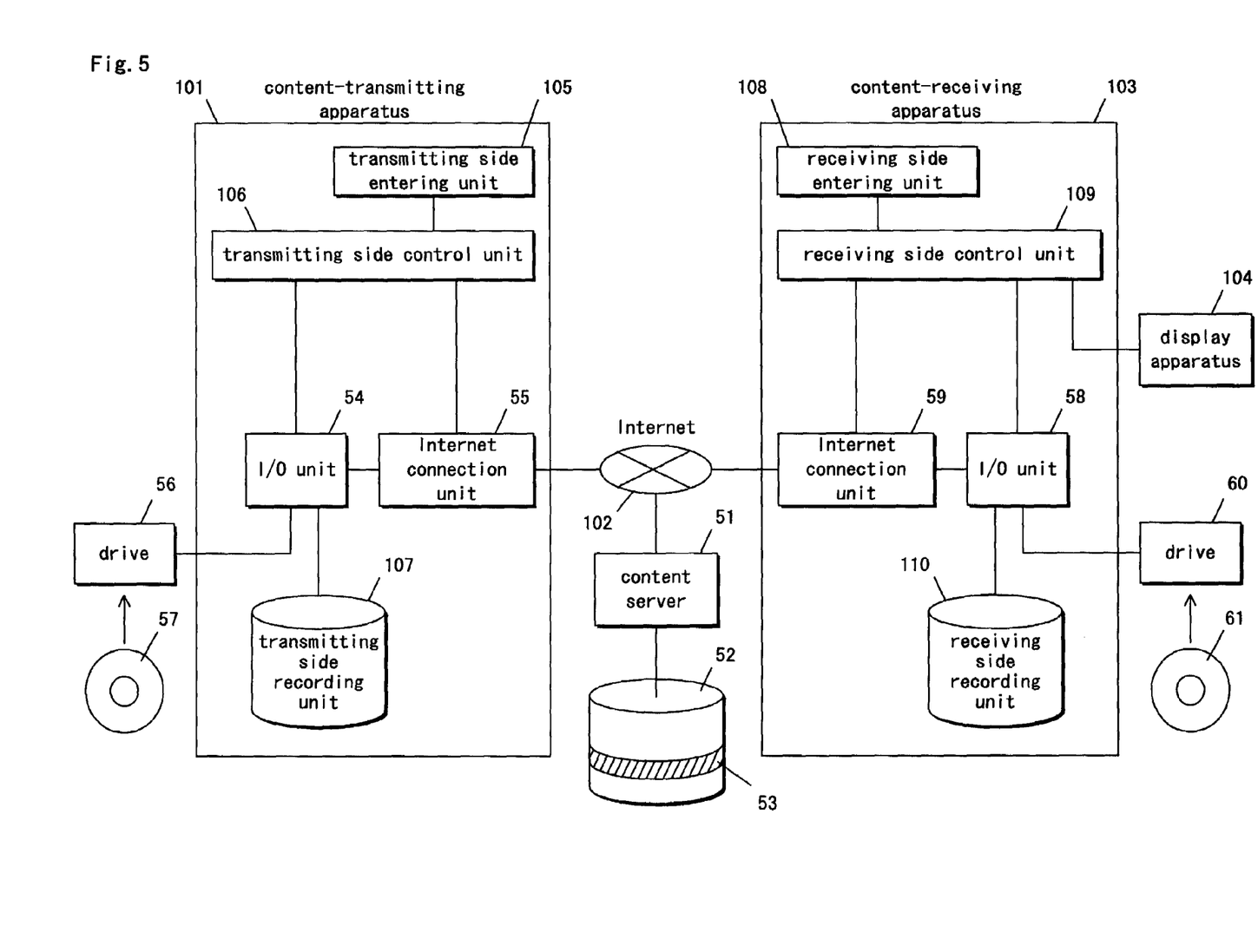
FIG. 5 is a block diagram, illustrating a content transmitting/receiving system in the other embodiment of the present invention.

Next, the other embodiment of the present invention is explained using FIG. 5.

FIG. 5 is a block diagram, illustrating a content transmitting/receiving system in the other embodiment of the present invention. Also, in FIG. 5, parts which are similar to those in FIG. 1 are given the same reference numbers, and description thereof is appropriately omitted.

In the present embodiment, a content server 51 exists on the Internet 102 that is an example of a network.

The content server 51 has a recording apparatus 52, which is composed of a large hard disk etc., and some of the domains are a shared domain 53 where both the content-transmitting apparatus 101 and the content-receiving apparatus 103 are allowed to access.

The content-transmitting apparatus 101 has an Internet connection unit 55 in order to connect with the Internet 102, and is comprised of an I/O unit 54 between the transmission side control unit 106 and the transmission side recording unit 107.

The I/O unit 54 is connected to a drive 56 that reads out information from a recording medium (for example, CD-ROM etc.) 57.

A content transmitting program for the above-mentioned construction is stored in the recording medium 57, and when the recording medium 57 is set to the drive 56, the content transmitting program is loaded or installed in the content-transmitting apparatus 101.

The content-receiving apparatus 103 is comprised of an Internet connection unit 59, an I/O unit 58, and a drive 60 as in the content-transmitting apparatus 101.

A content receiving program for the above-mentioned construction is stored in a recording medium 61, and when the recording medium 61 is set to the drive 60, this content receiving program is loaded or installed in the content-receiving apparatus 103.

In the present embodiment, it is sufficient for the content-transmitting apparatus 101 to upload content data and reproduction control information to the shared domain 53. The content-transmitting apparatus 101 does not need to directly transfer the content data and the reproduction control information to the content-receiving apparatus 103.

The content-receiving apparatus 103 downloads the content data and the reproduction control information which have been uploaded into the shared domain 53, and reproduces the content data according to the reproduction control information.

Also in the present embodiment, as for the content data transmitted to the content-receiving apparatus 103 in the past, transmission of the content data itself to the shared domain 53 is omitted and only reproduction control information is transmitted.

Thereby, the shared domain 53 can substitute the transmission side recording unit 107 and the receiving side recording unit 110, and the burden of storage capacity is reduced.

Since the communication path of the content-transmitting apparatus 101 becomes shorter, the transmitting burden of the content-transmitting apparatus 101 is decreased.

According to the present invention, a transmission source can set up the reproduction control information including the contents which the transmission source transmitted in the past to a transmission destination. Therefore, the transmission destination can reproduce contents without performing difficult operations, and the convenience of the transmission destination can be improved.

A transmission destination, who is not well versed in complicated operation of a personal computer or AV equipment, can also easily view and listen to the contents transmitted from the transmission source just like changing television channels.

Since retransmitting of contents transmitted in the past, except additional contents, is not necessary, the burden of a network can be reduced, required time for completion of transmitting/receiving can be shorten, and the capacity of a receiving side recording unit can be saved.

Deletion of the contents which the transmission source transmitted in the past to the transmission destination is enabled. Therefore, without deleting operations of contents, the transmission destination, who is not well versed in complicated operation of a personal computer or AV equipment, can receive contents without caring about overflow of the capacity of the receiving side recording unit.

It is possible to specify the order of reproduction, the reproducing section, and the reproduction date for contents including the contents which the transmission source transmitted in the past to the transmission destination. The transmission destination can reproduce contents without complicated operations, as the transmission source has intended.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A content-transmitting apparatus operable to transmit a content to a content-receiving apparatus via a network, the content-transmitting apparatus comprising:

a non-volatile recording medium configured to store data related to the content, ID information related to the content, information indicating a position of the data stored on said non-volatile recording medium, and reproduction control information related to the content; and a transmitting side control unit operable to transmit the data related to the content, the ID information related to the content, and the reproduction control information related to the content to the content-receiving apparatus, wherein the reproduction control information includes reproduction control information related to a content that has been previously transmitted to the content-receiving apparatus before the transmission of the reproduction control information, said transmitting side control unit is operable to omit transmission of the content that has been transmitted to the content-receiving apparatus before the transmission of the reproduction control information when it is determined that the reproduction control information indicates that the content has not yet been recorded by the content-receiving apparatus, and said transmitting side control unit is operable to transmit the reproduction control information related to the content that has been previously transmitted to the content-receiving apparatus.

2. A content-transmitting apparatus as recited in claim 1, wherein said transmitting side control unit is operable to transmit content that has not been transmitted to the content-receiving apparatus before the transmission of the reproduction control information, when the reproduction control information includes information related to the content that has not been transmitted to the content-receiving apparatus.

3. A content-transmitting apparatus as recited in claim 1, wherein the reproduction control information includes TV channel information to reproduce the content.

4. A content-transmitting apparatus as recited in claim 1, wherein the reproduction control information includes ID information of a content to be deleted.

5. A content-transmitting apparatus as recited in claim 1, wherein the reproduction control information includes order of reproduction of the content.

6. A content-transmitting apparatus as recited in claim 1, wherein the reproduction control information includes a reproduction section of the content.

7. A content-transmitting apparatus as recited in claim 1, wherein the reproduction control information includes a reproduction date of the content.

8. A content-receiving apparatus operable to receive a content via a network, comprising:
- a receiving side control unit operable to (i) receive data related to the content, ID information related to the content, and reproduction control information related to the content, and (ii) judge whether or not the reproduction control information indicates that the content has not yet been recorded by the content-receiving apparatus; and
- a receiving side recording unit including a non-volatile recording medium configured to store data related to the content, ID information related to the content, information indicating a position of the data stored on said non-volatile recording medium, and reproduction control information related to the content,
- wherein the reproduction control information includes reproduction control information regarding a content that has been received before transmission of the reproduction control information, and said receiving side control unit is operable to reproduce at least one of the content and a processed content of the content, according to the reproduction control information received by said receiving side control unit.

9. A content-receiving apparatus as recited in claim 8, wherein, when the content has been recorded by said receiving side recording unit before the transmission, said receiving side control unit is operable to reproduce at least one of the content recorded by said receiving side recording unit and a processed content of the content recorded by said receiving side recording unit, and
- wherein, when the content is attached to the reproduction control information received by said receiving side control unit, said receiving side control unit is operable to reproduce at least one of the content attached to the reproduction control information received by said receiving side control unit and a processed content of the attached content.

10. A content-receiving apparatus as recited in claim 8, wherein the content-receiving apparatus further comprises
- a receiving side input unit operable to receive changing operation for TV channels, and
- wherein said receiving control unit is operable to reproduce the content based on the changing operation for the TV channels.

11. A content-receiving apparatus as recited in claim 10, wherein the reproduction control information includes TV channel information to reproduce the content.

12. A content-receiving apparatus as recited in claim 8, wherein, when said receiving side control unit receives the reproduction control information including ID information of a content to be deleted, said receiving side control unit is operable to delete the content indicated by the ID information of the content to be deleted from said receiving side recording unit.

13. A content-receiving apparatus as recited in claim 8, wherein the reproduction control information includes an order of reproduction of the content, and
- wherein said receiving side control unit is operable to reproduce the content according to the order of reproduction of the content.

14. A content-receiving apparatus as recited in claim 8, wherein the reproduction control information includes a reproduction section of the content, and
- wherein said receiving side control unit is operable to reproduce the content according to the reproduction section of the content.

15. A content-receiving apparatus as recited in claim 8, wherein the reproduction control information includes a reproduction date of the content, and
- wherein said receiving side control unit is operable to reproduce the content according to the reproduction date of the content.

16. A content transmitting/receiving system, comprising:
- a content-transmitting apparatus comprising a transmitting side recording unit including a first non-volatile recording medium configured to store data related to the content, ID information related to the content, information indicating a position of the data stored on said first non-volatile recording medium, and reproduction control information related to the content;
- a content-receiving apparatus operable to (i) connect to said content-transmitting apparatus via a network, (ii) receive the data related to the content, the ID information related to the content, and the reproduction control information related to the content from said content-transmitting apparatus, and (iii) judge whether or not the reproduction control information indicates that the content has not yet been recorded by the content-receiving apparatus; and
- a display apparatus operable to connect to said content-receiving apparatus to display a content that is reproduced by said content-receiving apparatus,
- wherein said content-receiving apparatus comprises:
- a receiving side input unit operable to receive an input from a user;
- a receiving side recording unit including a second non-volatile recording medium configured to store data related to the content, ID information related to the content, information indicating a position of the data stored on said second non-volatile recording medium, and reproduction control information related to the content, received from said content-transmitting apparatus; and
- a receiving side control unit operable to control said receiving side input unit and said receiving side recording unit,
- wherein said content-transmitting apparatus is operable to transmit reproduction control information to said content-receiving apparatus, the reproduction control information includes reproduction control information regarding a content that has been transmitted to the content-receiving apparatus before transmission of the reproduction control information,
- wherein, when the content has been recorded by said receiving side recording unit before the transmission of the reproduction control information, said receiving side control unit is operable to reproduce, according to the reproduction control information, at least one of the content recorded by said receiving side recording unit and a processed content of the content recorded by said receiving side recording unit, and wherein, when the content is attached to the reproduction control information received by said receiving side control unit, said receiving side control unit is operable to reproduce, according to the reproduction control information, at least one of the content that is attached to the reproduction control information and is recorded by said receiving side recording unit and a processed content of the content that is attached to the reproduction control information and is recorded by said receiving side recording unit.

17. A content-transmitting method for transmitting a content to a content-receiving apparatus via a network, the content-transmitting method comprising:

storing, on a non-volatile recording medium, data related to the content, ID information related to the content, information indicating a position of the data stored on said non-volatile recording medium, and reproduction control information related to the content;

transmitting the data related to the content, the ID information related to the content, and the reproduction control information related to the content to the content-receiving apparatus;

wherein the reproduction control information includes reproduction control information regarding a content that has been transmitted to the content-receiving apparatus before transmission of the reproduction control information;

omitting transmission of a content that has been previously transmitted to the content-receiving apparatus before the transmission of the reproduction control information when it is determined that the reproduction control information indicates that the content has not yet been recorded by the content-receiving apparatus; and transmitting the reproduction control information regarding the content that has been previously transmitted.

18. A content-receiving method for receiving a content via a network, comprising:

receiving data related to the content, ID information related to the content, and reproduction control information related to the content;

judging whether or not the reproduction control information indicates that the content has not yet been recorded by the content-receiving apparatus; and storing, on a non-volatile recording medium, data related to the content, ID information related to the content, information indicating a position of the data stored on said non-volatile recording medium, and reproduction control information related to the content, wherein the reproduction control information includes reproduction control information regarding a content that has been received before transmission of the reproduction control information, and at least one of the content and a processed content of the content is reproduced according to the reproduction control information.

19. A content-receiving method as recited in claim 17, wherein the method further comprises recording the received content, reproducing at least one of the content and a processed content of the content when the content has been recorded before the transmission of the reproduction control information, and when the content is attached to the reproduction control information, reproducing at least one of the content attached to the reproduction control information and a processed content of the attached content.

20. A computer readable storage medium, having recorded therein a content-transmitting program transmitting a content to a content-receiving apparatus via a network, the content-transmitting program comprising:

a program portion operable to store, on a non-volatile recording medium, data related to the content, ID information related to the content, information indicating a position of the data stored on said non-volatile recording medium, and reproduction control information related to the content, a program portion operable to transmit the data related to the content, the ID information related to the content, and the reproduction information related to the content to the content-receiving apparatus, wherein the reproduction control information includes reproduction control information regarding a content that has been transmitted to the content-receiving apparatus before transmission of the reproduction control information, and a program portion operable to omit transmission of a content that has been previously transmitted to the content-receiving apparatus before the transmission of the reproduction control information when it is determined that reproduction control information indicates that the content has not yet been recorded by the content-receiving apparatus, and to transmit the reproduction control information regarding the content that has been previously transmitted.

21. A computer readable storage medium, having recorded therein a content-receiving program receiving a content via a network, the content-receiving program comprising:

a program portion operable to receive the data related to the content, ID information related to the content, and reproduction information related to the content; and a program portion operable to judge whether or not the reproduction control information indicates that the content has not yet been recorded by the content-receiving program, wherein the reproduction control information includes reproduction control information regarding a content that has been received before transmission of the reproduction control information, a program portion operable to store, on a non-volatile recording medium, data related to the content, ID information related to the content, information indicating a position of the data stored on said non-volatile recording medium, and reproduction control information related to the content, and a program portion operable to reproduce at least one of the content and a processed content of the content according to the reproduction control information.

* * * * *